United States Patent
Yun (10) Patent No.: US 10,116,688 B1
(45) Date of Patent: Oct. 30, 2018

(54) SYSTEMS AND METHODS FOR DETECTING POTENTIALLY MALICIOUS FILES

(71) Applicant: Symantec Corporation, Mountain View, CA (US)

(72) Inventor: James Yun, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 403 days.

(21) Appl. No.: 14/666,337

(22) Filed: Mar. 24, 2015

(51) Int. Cl.
*H04L 29/06* (2006.01)
*G06F 21/56* (2013.01)

(52) U.S. Cl.
CPC ............ *H04L 63/145* (2013.01); *G06F 21/56* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 5,113,494 A | 5/1992 | Menendez et al. | |
| 7,328,456 B1 * | 2/2008 | Szor | G06F 21/56 713/165 |
| 7,448,085 B1 * | 11/2008 | Reyes | G06F 21/56 726/22 |
| 7,620,992 B2 | 11/2009 | Monastyrsky et al. | |
| 7,874,001 B2 | 1/2011 | Beck et al. | |
| 8,499,354 B1 | 7/2013 | Satish et al. | |
| 8,539,578 B1 | 9/2013 | Zhou et al. | |
| 8,667,583 B2 | 3/2014 | Polyakov et al. | |
| 8,769,685 B1 | 7/2014 | Conrad et al. | |
| 8,776,218 B2 | 7/2014 | Wright | |
| 8,839,428 B1 | 9/2014 | Oliver et al. | |
| 8,893,278 B1 * | 11/2014 | Chechik | H04L 63/145 713/188 |
| 8,898,276 B1 * | 11/2014 | Pimentel | H04L 63/145 709/224 |
| 9,043,786 B1 | 5/2015 | Hodge et al. | |

(Continued)

FOREIGN PATENT DOCUMENTS

EP 2 492 833 A1 8/2012

OTHER PUBLICATIONS

Joseph Chen; Systems and Methods for Leveraging Existing Client Computing Environments as Simulated Threat Ecosystems; U.S. Appl. No. 14/290,303, filed May 29, 2014.
James Yun; Systems and Methods for Creating Behavioral Signatures Used to Detect Malware; U.S. Appl. No. 14/656,739, filed Mar. 13, 2015.

(Continued)

*Primary Examiner* — Simon P Kanaan
(74) *Attorney, Agent, or Firm* — FisherBroyles, LLP (57) ABSTRACT

The disclosed computer-implemented method for detecting potentially malicious files may include (1) detecting an attempt by the computing device to execute a file, (2) prior to execution of the file, determining that a filename of the file contains a combination of characters indicative of a false filename extension included within a middle section of the filename, (3) determining, based at least in part on the false filename extension being included within the middle section of the filename, that the file is potentially malicious, and then in response to determining that the file is potentially malicious, (4) preventing the computing device from executing the file. Various other methods, systems, and computer-readable media are also disclosed.

16 Claims, 7 Drawing Sheets

(56) References Cited

U.S. PATENT DOCUMENTS

| | | | |
|---|---|---|---|
| 9,483,643 | B1 | 11/2016 | Yun |
| 9,794,618 | B2* | 10/2017 | Pearson ............ H04N 21/43615 |
| 2002/0129264 | A1 | 9/2002 | Rowland et al. |
| 2004/0002942 | A1* | 1/2004 | Pudipeddi ......... G06F 17/30067 |
| 2005/0265331 | A1 | 12/2005 | Stolfo |
| 2007/0038677 | A1 | 2/2007 | Reasor et al. |
| 2008/0027891 | A1 | 1/2008 | Repasi et al. |
| 2008/0262990 | A1* | 10/2008 | Kapoor ................. G06F 9/505 706/20 |
| 2009/0126012 | A1* | 5/2009 | Treadwell .............. G06F 21/56 726/22 |
| 2009/0241192 | A1 | 9/2009 | Thomas |
| 2009/0328215 | A1 | 12/2009 | Arzi et al. |
| 2010/0031358 | A1 | 2/2010 | Elovici et al. |
| 2010/0077481 | A1 | 3/2010 | Polyakov et al. |
| 2010/0235913 | A1 | 9/2010 | Craioveanu et al. |
| 2010/0251363 | A1 | 9/2010 | Todorovic |
| 2012/0079596 | A1 | 3/2012 | Thomas et al. |
| 2012/0278884 | A1 | 11/2012 | Menoher |
| 2012/0304244 | A1 | 11/2012 | Xie et al. |
| 2013/0139268 | A1 | 5/2013 | An et al. |
| 2013/0290732 | A1 | 10/2013 | Branton |
| 2013/0298201 | A1 | 11/2013 | Aravindakshan et al. |
| 2013/0312098 | A1 | 11/2013 | Kapoor et al. |
| 2013/0347052 | A1 | 12/2013 | Choudrie |
| 2014/0049554 | A1 | 2/2014 | Chen et al. |
| 2014/0082751 | A1 | 3/2014 | Vipat et al. |
| 2014/0137180 | A1 | 5/2014 | Lukacs et al. |
| 2014/0165203 | A1 | 6/2014 | Friedrichs et al. |
| 2014/0199664 | A1 | 7/2014 | Sadeh-Koniecpol et al. |
| 2015/0007312 | A1* | 1/2015 | Pidathala .............. H04L 63/145 726/22 |
| 2015/0020203 | A1* | 1/2015 | Xie ......................... G06F 21/56 726/24 |
| 2015/0101049 | A1 | 4/2015 | Lukacs et al. |
| 2015/0379264 | A1 | 12/2015 | Alme et al. |

OTHER PUBLICATIONS

James Yun; Systems and Methods for Detecting Potentially Malicious Applications; U.S. Appl. No. 14/656,741, filed Mar. 13, 2015.
"Antivirus software", http://en.wikipedia.org/wiki/Antivirus_software, as accessed Jan. 16, 2015, Wikipedia, (Mar. 15, 2004).
"Common Malware Types: Cybersecurity 101", https://www.veracode.com/blog/2012/10/common-malware-types-cybersecurity-101, as accessed Jan. 16, 2015, Veracode, (Oct. 12, 2012).
Sean M. Hittel, et al; Systems and Methods for Detecting Text Display Manipulation Attacks; U.S. Appl. No. 14/673,902, filed Mar. 31, 2015.
"URLDownloadToFile function", https://msdn.microsoft.com/en-us/library/ie/ms775123(v=vs.85).aspx, as accessed Jan. 16, 2015, Microsoft, (on or before Jan. 16, 2015).
"How to use the URLDownloadToFile() Function???", http://www.cplusplus.com/forum/windows/107840/, as accessed Jan. 16, 2015, (Aug. 2, 2013).
"Should I use URLDownloadToFile?", http://stackoverflow.com/questions/5184988/should-i-use-urldownloadtofile, as accessed Jan. 16, 2015, (Mar. 3, 2011).
"URLDownloadToCacheFile function", https://msdn.microsoft.com/en-us/library/ie/ms775122(v=vs.85).aspx, as accessed Jan. 16, 2015, Microsoft, (on or before Jan. 16, 2015).
Su, Chen "Download a File Using URLDownloadToCacheFile", http://www.codeproject.com/Articles/3096/Download-a-File-Using-URLDownloadToCacheFile, as accessed Jan. 16, 2015, (Oct. 25, 2002).
"System call", http://en.wikipedia.org/wiki/System_call, as accesses Jan. 16, 2015, Wikipedia, (Jun. 17, 2004).
"How do antiviruses scan for thousands of malware signatures in a short time?", http://security.stackexchange.com/questions/30362/how-do-antiviruses-scan-for-thousands-of-malware-signatures-in-a-short-time, as accessed Jan. 16, 2015, (Feb. 6, 2013).
Martin, Luther "A clever use for U+202E", http://www.voltage.com/blog/standards/a-clever-use-for-u202e/, as accessed Jan. 16, 2015, Blog, HP Security Voltage, (Jun. 7, 2011).

* cited by examiner

SYSTEMS AND METHODS FOR DETECTING POTENTIALLY MALICIOUS FILES

BACKGROUND

As the use of internet-enabled devices grows, attackers may increasingly attempt to distribute and/or trick users into downloading illegitimate or malicious files. Once executed by or downloaded to a computing device, a malicious file may perform one or more harmful behaviors, such as tracking a user's computing activity, gaining access to sensitive information stored within a computing device, and/or hindering the performance of a computing device.

Attackers may attempt to trick users into downloading malicious files by designing the filenames of the files to appear innocuous. For example, an attacker may implement a multi-extension attack by inserting a filename extension (e.g., txt, pdf, png, etc.) and several blank or place-holding characters into the middle of a filename. When a user downloads the file, a user interface that displays the filename may cut off or truncate the final characters of the filename, thereby preventing the user from viewing the actual extension of the file. As such, the file may appear to be a benign text or media file instead of an executable or other file type more commonly associated with malware.

Unfortunately, traditional methods for detecting malicious files may be unable to accurately and/or efficiently detect multi-extension attacks. The instant disclosure, therefore, identifies and addresses a need for improved systems and methods for detecting potentially illegitimate files.

SUMMARY

As will be described in greater detail below, the instant disclosure describes various systems and methods for detecting potentially malicious files by determining that a file contains a suspicious combination of characters within the middle of its filename. By detecting the false filename extension, the systems and methods described herein may determine that the file is potentially malicious and then prevent a computing device from executing the file.

In one example, a computer-implemented method for detecting potentially malicious files may include (1) detecting an attempt by the computing device to execute a file, (2) prior to execution of the file, determining that a filename of the file contains a combination of characters indicative of a false filename extension included within a middle section of the filename, (3) determining, based at least in part on the false filename extension being included within the middle section of the filename, that the file is potentially malicious, and then in response to determining that the file is potentially malicious, (4) preventing the computing device from executing the file.

In some examples, the method may also include hooking a system call issued by an application launched from the file. Additionally or alternatively, the method may include comparing the filename to a malware signature that identifies the combination of characters.

In some embodiments, the method may include determining that the false filename extension within the middle section of the filename is followed by an actual filename extension within an end section of the filename. In these embodiments, the actual filename extension may be an executable extension, and the false filename extension may be a non-executable extension.

In some examples, the method may include determining that the filename contains a period followed by at least a certain number of padding characters that are used to obfuscate an actual filename extension of the file from the view of a user. Additionally or alternatively, the method may include determining that the filename contains a period preceded by at least a certain number of padding characters. In these examples, the padding characters may include periods and/or blank spaces.

In one embodiment, a system for implementing the above-described method may include (1) a detection module that detects an attempt by a computing device to execute a file, (2) a determination module that (A) determines, prior to execution of the file, that a filename of the file contains a combination of characters indicative of a false filename extension included within a middle section of the filename and (B) determines, based at least in part on the false filename extension being included within the middle section of the filename, that the file is potentially malicious, (3) a security module that prevents the computing device from executing the file in response to determining that the file is potentially malicious, and (4) at least one physical processor configured to execute the detection module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect an attempt by the computing device to execute a file, (2) determine, prior to execution of the file, that a filename of the file contains a combination of characters indicative of a false filename extension included within a middle section of the filename, (3) determine, based at least in part on determining that the false filename extension is included within the middle section of the filename, that the file is potentially malicious, and then (4) prevent the computing device from executing the file in response to determining that the file is potentially malicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting potentially malicious files. As will be explained in greater detail below, by determining that a filename of a file contains a combination of characters indicative of a false filename extension included within the middle of the filename, the systems and methods described herein may detect a multi-extension attack that attempts to portray a malicious file as a benign or harmless file (e.g., a text or media file). For example, the disclosed systems and methods may determine that a file's filename includes a certain number of padding characters (e.g., periods and/or blank spaces) inserted between a false filename extension and an actual filename extension. In this example, the disclosed systems and methods may determine that the file is potentially malicious based at least in part on the padding characters inserted between the false filename extension and the actual filename extension.

Moreover, the disclosed systems and methods may enable a computing device to detect such an attack before the computing device executes the file and without analyzing the contents and/or behavior of the file. By enabling the computing device to detect such an attack in this way, the disclosed systems and methods may also thwart the attack by prevent the computing device from executing the file.

Figure 1:
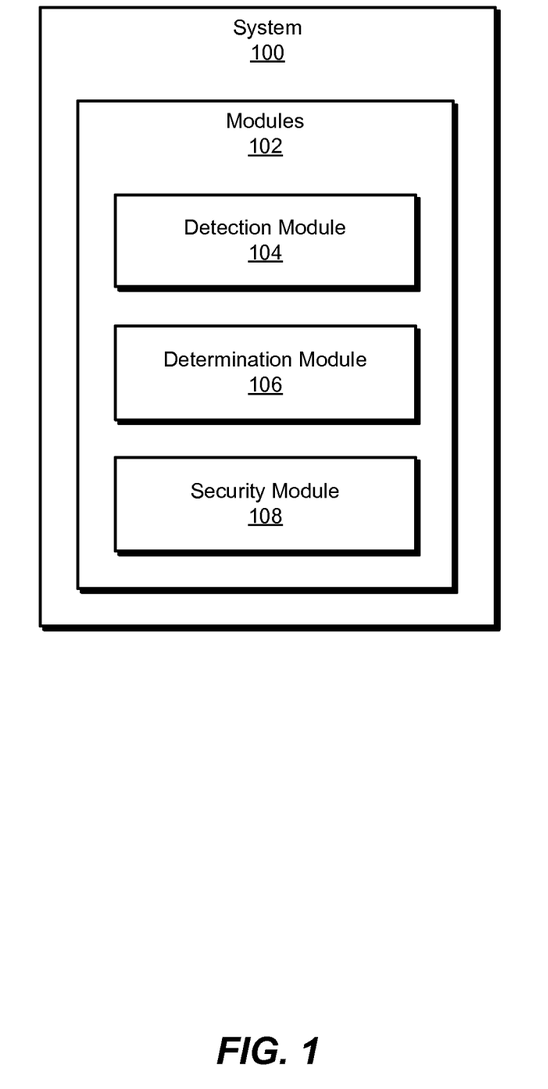
FIG. 1 is a block diagram of an exemplary system for detecting potentially malicious files.
Figure 2:
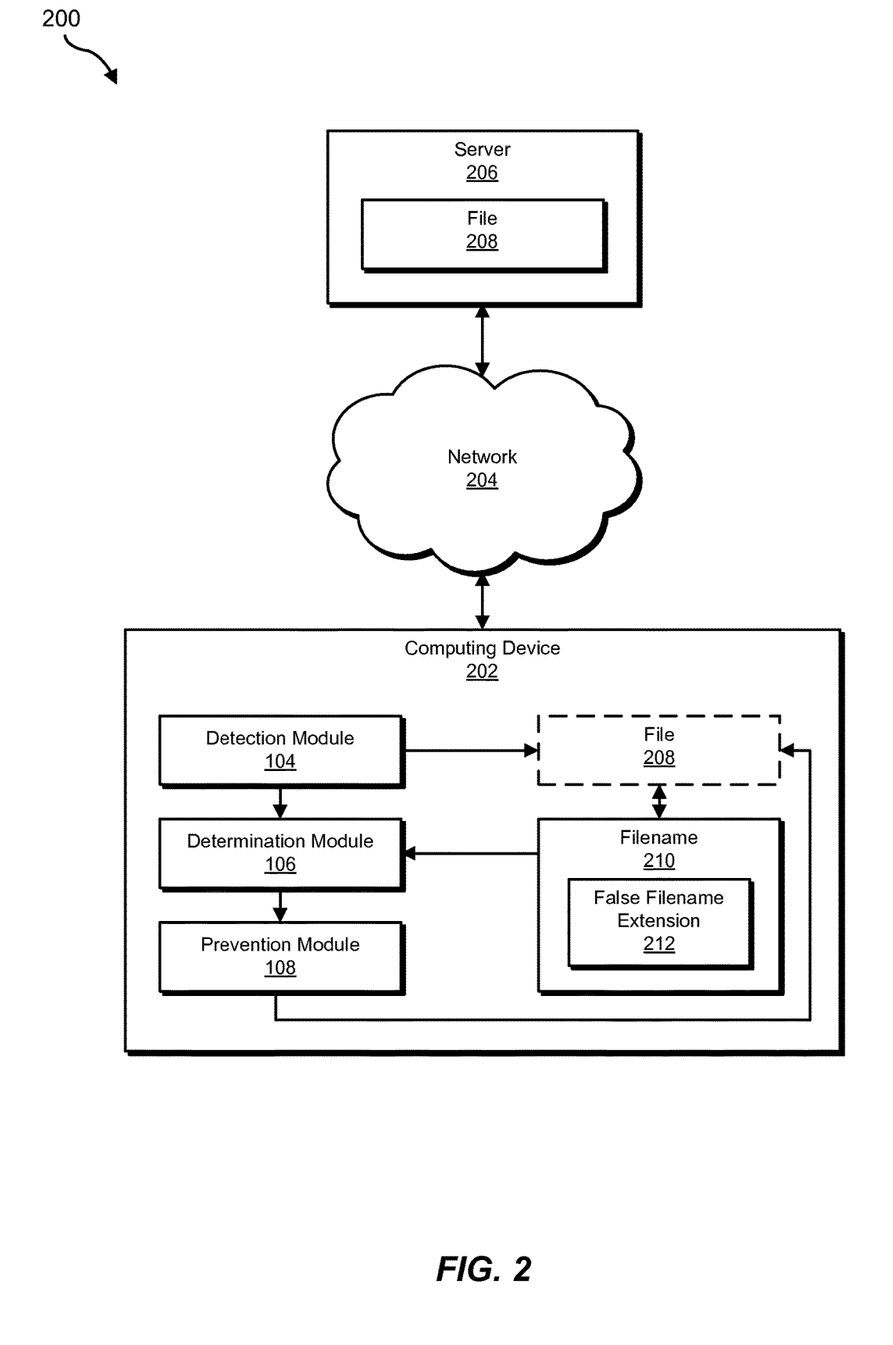
FIG. 2 is a block diagram of an additional exemplary system for detecting potentially malicious files.

The following will provide, with reference to FIGS. 1-2, detailed descriptions of exemplary systems for detecting potentially malicious files. Detailed descriptions of corresponding computer-implemented methods will also be provided in connection with FIG. 3. In addition, detailed descriptions of exemplary filenames that include false filename extensions will be provided in connection with FIG. 4. Detailed descriptions of exemplary user interfaces that display filenames with false filename extensions will be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting potentially malicious files. As illustrated in this figure, exemplary system 100 may include one or more modules 102 for performing one or more tasks. For example, and as will be explained in greater detail below, exemplary system 100 may include a detection module 104 that detects an attempt by a computing device to execute a file. Exemplary system 100 may also include a determination module 106 that (1) determines, prior to execution of the file, that a filename of the file contains a combination of characters indicative of a false filename extension included within a middle section of the filename and then (2) determines, based at least in part on the false filename extension being included within the middle section of the filename, that the file is potentially malicious.

In addition, and as will be described in greater detail below, exemplary system 100 may include a security module 108 that prevents the computing device from executing the file. Although illustrated as separate elements, one or more of modules 102 in FIG. 1 may represent portions of a single module or application (such as SYMANTEC'S NORTON ANTIVIRUS, SYMANTEC'S NETWORK SECURITY, SYMANTEC'S NORTON INTERNET SECURITY, MCAFEE ALL ACCESS, MCAFEE TOTAL PROTECTION, MCAFEE INTERNET SECURITY, F-SECURE ANTI-VIRUS, TITANIUM ANTIVIRUS+SECURITY, and/or KASPERSKY ANTI-VIRUS).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 in order to detect a potentially malicious files downloaded to computing device 202. Additionally or alternatively, server 206 may be programmed with one or more of modules 102 in order to detect potentially malicious files before they are executed by computing device 202.

In one embodiment, one or more of modules 102 from FIG. 1 may, when executed by at least one processor of computing device 202, enable computing device 202 and/or server 206 to detect potentially malicious files. For example, and as will be described in greater detail below, detection module 104 may cause computing device 202 to detect an attempt by computing device 202 to execute a file 208. Prior to execution of file 208, determination module 106 may cause computing device 202 to determine that a filename 210 of file 208 contains a combination of characters indicative of a false filename extension 212 included within a middle section of filename 210. Next, determination module 106 may cause computing device 202 and/or server 206 to determine, based at least in part on false filename extension 212 being included within the middle section of filename 210, that file 208 is potentially malicious. In response to the determination that file 208 is potentially malicious, security module 108 may prevent computing device 202 from executing file 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device capable of hosting, distributing, and/or providing access to a file. Examples of server 206 include, without limitation, application servers, web servers, storage servers, security servers, and/or database servers configured to run certain software applications and/or provide various web, storage, security, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, variations of one or more of the same, combinations of one or more of the same, or the like. Network 204 may facilitate communication or data transfer using wireless or wired connections. In one embodiment, network 204 may facilitate communication between computing device 202 and server 206.

Figure 3:
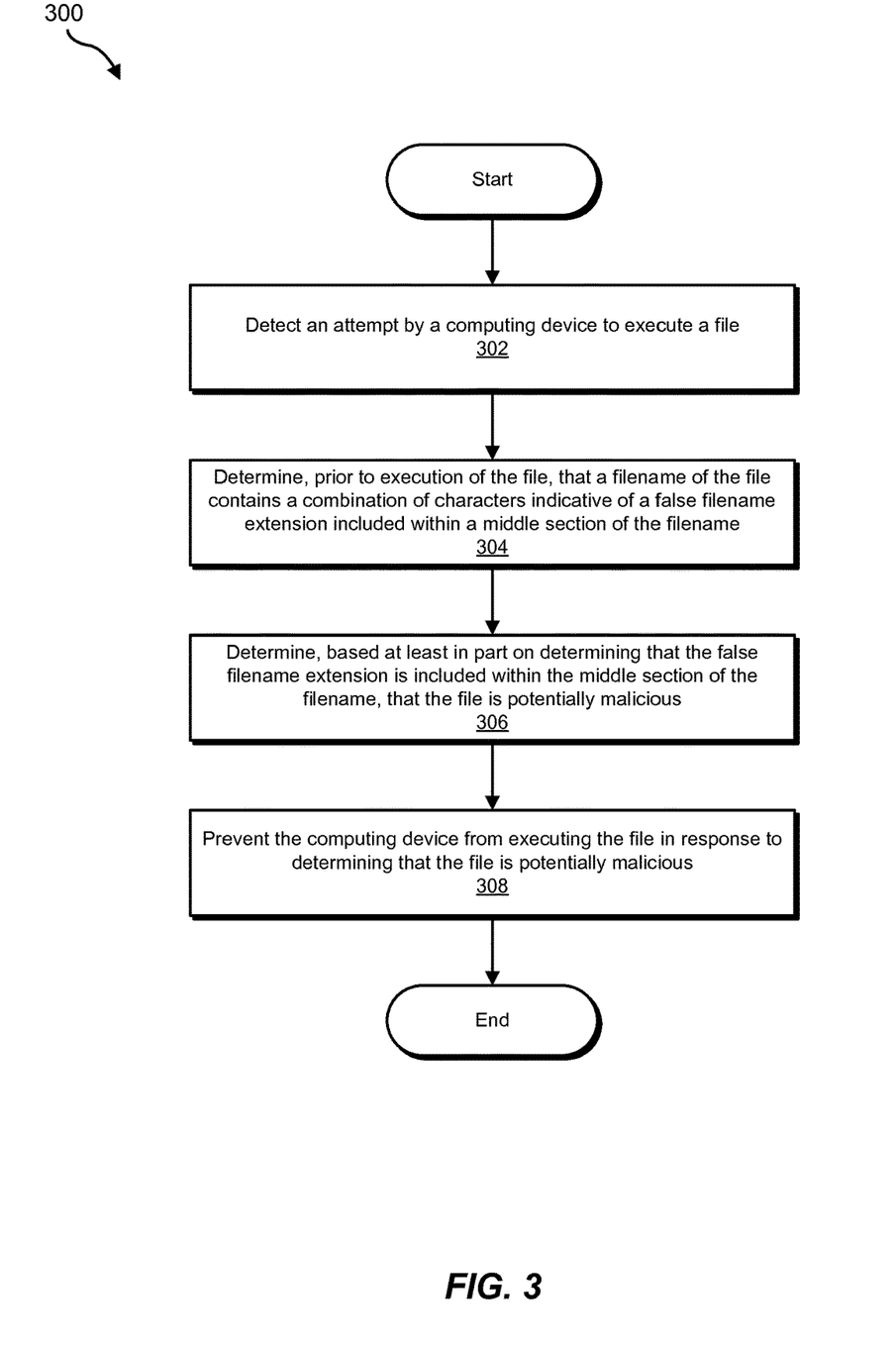
FIG. 3 is a flow diagram of an exemplary method for detecting potentially malicious files.

FIG. 3 is a flow diagram of an exemplary computer-implemented method 300 for detecting potentially malicious files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may detect an attempt by a computing device to execute a file. For example, detection module 104 may, as part of computing device 202 in FIG. 2, detect an attempt by computing device 202 to execute file 208. The term "file," as used herein, generally refers to any type or form of software, formatted portion of data, or section of code that may be executed by, installed within, downloaded to, or otherwise accessed by a computing device. Examples of file 208 include, without limitation, executable files, batch files, scripts, Hypertext Preprocessor (PHP) files, HyperText Markup Language (HTML) files, image files, text files, video files, variations of one or more of the same, combinations of one or more of the same, or any other suitable file.

The systems described herein may detect an attempt by a computing device to execute a file in a variety of ways. In some examples, detection module 104 may determine that a user of computing device 202 has accessed or is attempting to access file 208 from server 206 via network 204. Additionally or alternatively, detection module 104 may determine that a user of computing device 202 has downloaded file 208 from a storage device, saved file 208 to a portion of memory within computing device 202, opened file 208 from within a file system of computing device 202, and/or accessed file 208 in any other suitable way.

In an exemplary embodiment, detection module 104 may hook (e.g., identify or intercept) a system call issued by an application launched from file 208. The term "system call," as used herein, generally refers to any type or form of communication and/or interface between an application and the kernel of an operating system. A system call may request a service from an operating system, such as to access or direct a hardware component, schedule the execution of a process, or create a new process.

In some examples, when a user directs file 208 to open or execute, file 208 may launch an application (e.g., an installer application or an application that executes files of the same type as file 208) that facilitates executing file 208. The launched application may make a system call that includes a request to execute file 208 to the operating system of computing device 202. Detection module 104 may hook the system call made by the launched application to determine that computing device 202 is attempting to execute file 208.

Returning to FIG. 3, at step 304 one or more of the systems described herein may determine, prior to execution of the file, that a filename of the file contains a combination of characters indicative of a false filename extension included within a middle section of the filename. For example, determination module 106 may, as part of computing device 202 in FIG. 2, determine that filename 210 contains a combination of characters indicative of false filename extension 212 within a middle section of filename 210.

The term "filename," as used herein, generally refers to any type or form of label, text, or string assigned to a file that identifies the file (e.g., within a file system of a computing device). In some examples, a filename may be composed of letters, numbers, special characters, or other human-readable text. In addition, a filename may contain multiple sections (such as a beginning section, middle section, and/or an end section) located within and/or representing certain portions of the filename.

The term "beginning section," as used herein, generally refers to any portion of a filename that is located (in languages read from left to right) to the left of a period followed by at least a certain number of padding characters. In one example, a beginning section of a filename may include and/or identify a base name of the file (e.g., "Final Presentation," "CatPicture23," etc.)

The term "end section," as used herein, generally refers to any portion of a filename that is located (in languages read from left to right) to the right of a period preceded by at least a certain number of padding characters. In one example, an end section of a filename may include and/or identify the file's actual filename extension.

The term "middle section," as used herein, generally refers to any portion of a filename that is located in the middle of and/or in-between a period followed by at least a certain number of padding characters and a period preceded by those padding characters. In one example, a middle section of a filename may include a false filename extension located between a base name of the file and the file's actual filename extension.

The term "padding character," as used herein, generally refers to any type or form of character that inserted into a filename in order to obfuscate an actual filename extension from the view of a user (within, e.g., a user interface). Examples of such padding characters include, without limitation, blank spaces, periods, underscores, any character hidden from or not visible to a user, variations of one or more of the same, combinations of one or more of the same, or any other suitable padding characters.

The term "filename extension," as used herein, generally refers to any set of characters within a filename of a file that allegedly corresponds to and/or represents the file type of the file. In one example, a filename extension may be used to identify a method of encoding and/or reading the contents of a file. Examples of filename extensions include, without limitation, exe (designating an executable file), jpeg, png, bmp (designating image files), doc, docx, txt (designating text files), variations of one or more of the same, combinations of one or more of the same, or any other suitable filename extension.

The term "false filename extension," as used herein, generally refers to any type or form of filename extension that does not correspond to and/or accurately represent the file type of a file and/or that is not located at the end of the file's filename. In contrast, the term "actual filename extension," as used herein, generally refers to any type or form of filename extension that corresponds to and/or accurately represents the file type of a file and/or that is located at the end of the file's filename.

In some examples, a filename may include only a beginning section (e.g., a base name) and an end section (e.g., a filename extension) separated by a period. As a specific example, a file may have a filename of "GoodTextFile.txt." However, as will be explained in greater detail below, filenames of certain malicious files may also contain a middle section that includes a false filename extension and/or one or more additional characters.

The systems described herein may determine that a filename contains a false filename extension in a variety of ways. In some examples, determination module 106 may determine that filename 210 includes two filename extensions. For example, determination module 106 may determine that filename 210 includes false filename extension 212 within the middle of filename 210 and an actual filename extension at the end of filename 210. In this example, determination module 106 may determine that false filename extension 212 differs from the actual filename extension of file 208. Additionally or alternatively, determination module 106 may determine that an attacker is attempting to portray the file type of file 208 as the file type indicated by false filename extension 212.

In an exemplary embodiment, determination module 106 may determine that the actual filename extension is an executable extension (e.g., an exe extension). In this embodiment, determination module 106 may determine that false filename extension 212 is a non-executable extension (e.g., an image file extension, a text file extension, or other likely extension of a non-malicious file).

Figure 4:
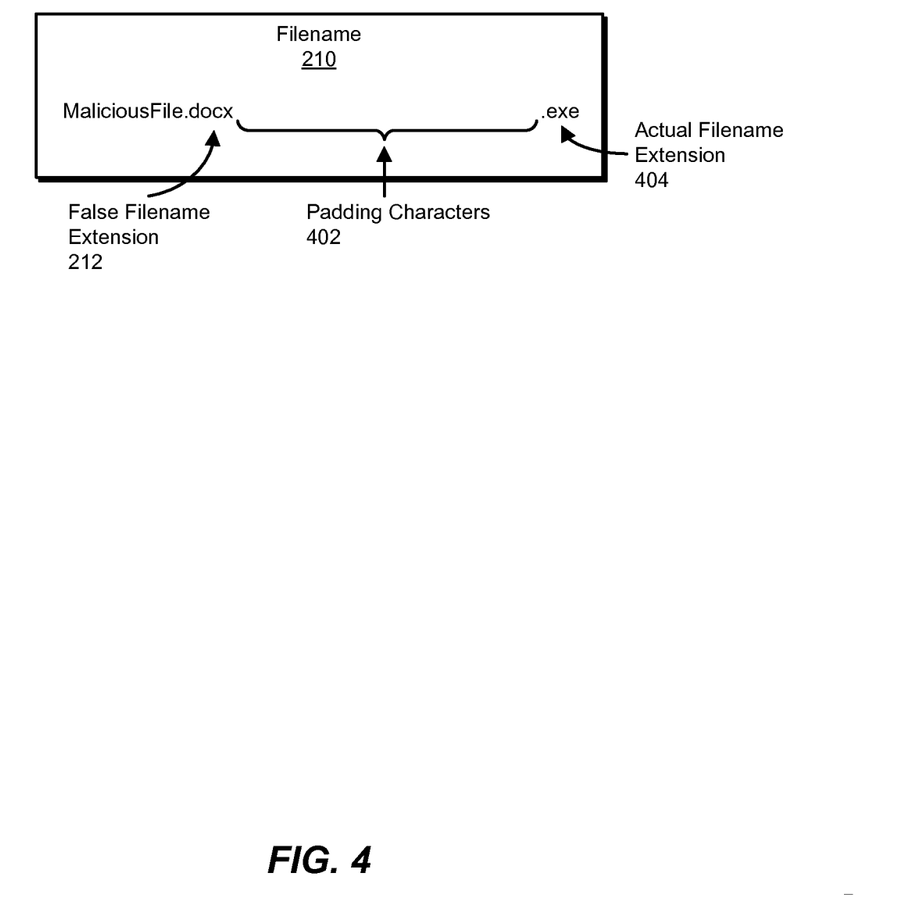
FIG. 4 is an illustration of an exemplary filename that includes a false filename extension.

As a specific example, determination module 106 may identify false filename extension 212 and an actual filename extension 404 within filename 210 in FIG. 4. As shown in FIG. 4, filename 210 may contain a base name of "MaliciousFile." In this example, false filename extension 212 may be "docx" and actual filename extension 404 may be "exe." In this example, determination module 106 may determine that false filename extension 212 and actual filename extension 404 are separated by one or more padding characters.

In some examples, determination module 106 may determine that filename 210 contains false filename extension 212 by identifying one or more suspicious combinations of padding characters and periods within filename 210. In one example, determination module 106 may determine that filename 210 contains a period followed at any point by at least a certain number (e.g., 2, 10, 25, etc.) of padding characters. For example, determination module 106 may identify, within filename 210 in FIG. 4, the period between "MaliciousFile" and "docx." In this example, determination module 106 may then identify padding characters 402 (in this example, a series of 53 blank spaces) following the period between "MaliciousFile" and "docx."

In another example, determination module 106 may determine that filename 210 contains a period preceded by at least a certain number of padding characters. For example, determination module 106 may identify padding characters 402 in FIG. 4 and the period directly following padding characters 402 in FIG. 4.

In a further example, determination module 106 may determine that filename 210 contains at least a certain number of padding characters between two periods. For example, determination module 106 may identify the period between "MaliciousFile" and "docx" within filename 210 in FIG. 4, the period between padding characters 402 and "exe" in FIG. 4, and padding characters 402 between the two periods in FIG. 4.

In an exemplary embodiment, determination module 106 may determine that filename 210 contains false filename extension 212 by comparing filename 210 to one or more malware signatures. The terms "malware signature" and "signature," as used herein, generally refer to any type or form of representation, summary, and/or hash of all or a portion of a file or filename.

In some examples, determination module 106 may identify, receive, or generate signatures that represent possible combinations of characters that are indicative of a false filename extension. For example, determination module 106 may generate signatures that identify combinations that include a period before the padding characters, combinations that include a period after the padding characters, combinations that include padding characters between two periods, and/or combinations that include different numbers of padding characters. Moreover, in some examples, determination module 106 may create signatures that specify one or more certain actual filename extensions. For example, determination module 106 may create a signature that convicts a filename only when the filename contains a particular arrangement of padding characters and periods and has an actual filename extension of "exe" (or other filename extension associated with malware).

In some embodiments, determination module 106 may receive one or more signatures from a security server or database (not illustrated in FIG. 2). For example, a security server that operates in conjunction with the systems described herein as part of an anti-malware solution may identify all or a portion of the combinations of periods and padding characters described above. The security server may then generate signatures that represent the combinations and distribute the signatures to determination module 106 within computing device 202.

At step 306, one or more of the systems described herein may determine that the file is potentially malicious based at least in part on the false filename extension being included within the middle section of the filename. For example, determination module 106 may, as part of computing device 202 in FIG. 2, determine that file 208 is potentially malicious based at least in part on false filename extension 212 being included within the middle section of filename 210. In other words, determination module 106 may determine that file 208 is potentially malicious based at least in part on false filename extension 212 being included within the middle section of filename 210.

The term "malicious file," as used herein, generally refers to any type or form of potentially harmful file designed to perform one or more malicious and/or deceptive actions (such as tracking a user's computing activity, accessing sensitive information stored on a computing device, or otherwise compromising the functionality or security of a computing device). Examples of malicious files include, without limitation, malware, viruses, worms, Trojan horses, adware, spyware, files that contain and/or launch one or more of the same, variations of one or more of the same, combinations of one or more of the same, or any other malicious files.

The systems described herein may determine that the file is potentially malicious in a variety of ways. In some examples, determination module 106 may determine that an attacker has purposely included false filename extension 212 within filename 210. Specifically, determination module 106 may determine that filename 210 is part of a multi-extension attack that attempts to obfuscate the actual filename extension of file 208 from the view of a user when filename 210 is displayed within a user interface.

Figure 5:
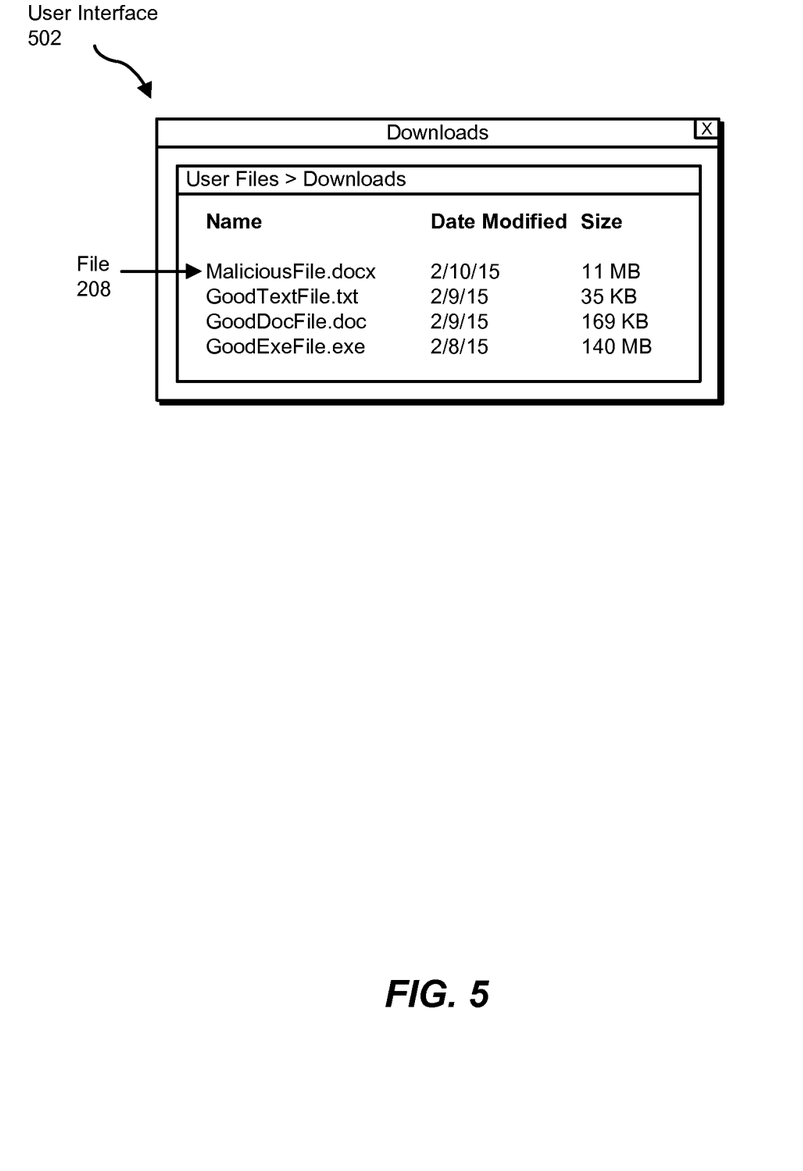
FIG. 5 is an illustration of an exemplary user interface that displays a filename that includes a false filename extension.

FIG. 5 illustrates an example of how the actual filename extension of filename 210 may be obfuscated from the view of a user within a user interface 502. As illustrated in FIG. 5, user interface 502 may display the name, most recent modification date, and size of files recently downloaded onto computing device 202. In this example, user interface 502 may be configured to display only the first 20 characters of each filename. Since, in this example, filename 210 (as illustrated in FIG. 4) contains more than 20 characters, user interface 502 in FIG. 5 may display the filename 210 as simply "MaliciousFile.docx" without displaying actual filename extension 404. In other words, user interface 502 in FIG. 2 may be configured to truncate the filename 210 to the first 20 characters (for, e.g., the viewing convenience of the user).

At step 308, one or more of the systems described herein may prevent the computing device from executing the file in response to determining that the file is potentially malicious. For example, security module 108 may, as part of computing device 202 in FIG. 2, prevent computing device 202 from executing file 208 in response to the determination that file 208 is potentially malicious.

The systems described herein may prevent the computing device from executing the file in a variety of ways. In some examples, security module 108 may automatically delete or quarantine file 208. Additionally or alternatively, security module 108 may alert (via, e.g., a user interface) a user of computing device 202 that file 208 is potentially malicious. For example, security module 108 may direct the user of computing device 202 to delete file 208 from computing device 202 and/or proceed with caution when handling and/or executing file 208. Moreover, in some embodiments, security module 108 may perform one or more malware scans on the content or behavior of file 208 in order to more accurately determine whether file 208 is malicious.

As explained above, a computing device may detect an attempt, by the computing device, to execute a file. Prior to execution of the file, the computing device may analyze the filename of the file to determine whether the filename contains a suspicious combination of characters indicative of a false filename extension. In the event that the computing device identifies such a suspicious combination of characters, the computing device may determine that the file is potentially malicious. The computing device may then prevent the execution of the potentially malicious file.

Figure 6:
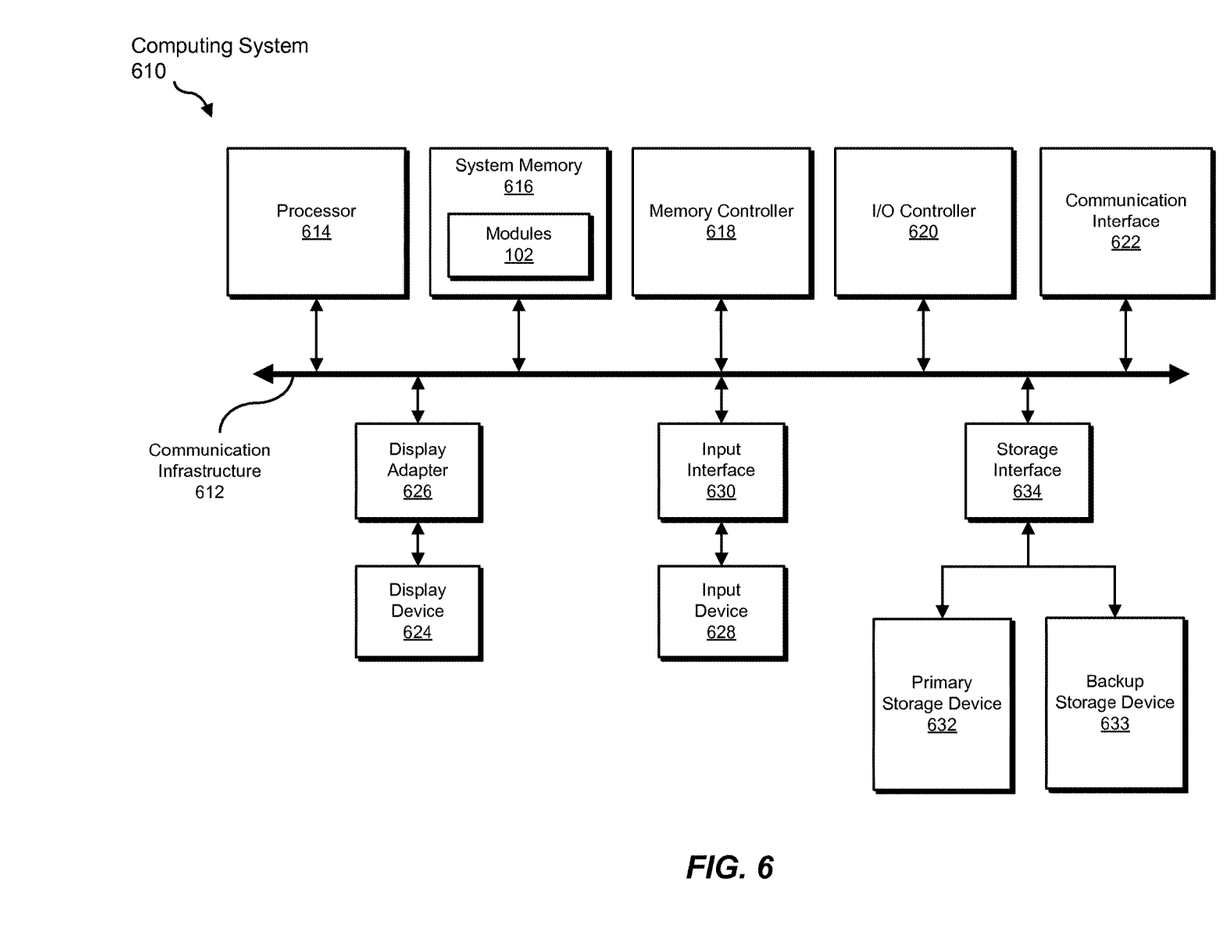
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
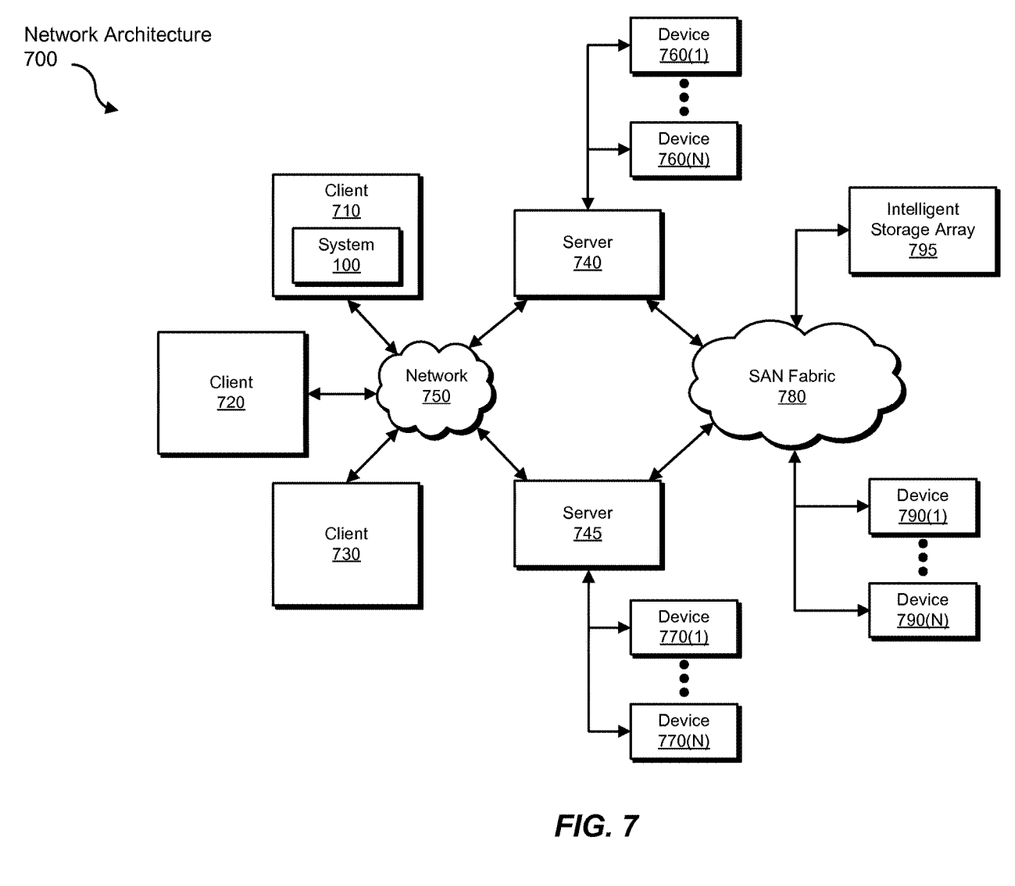
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting potentially malicious files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a filename of a file, transform the filename, output a result of the transformation to a computing device that is attempting to execute the file, use the result of the transformation to determine that the file is potentially malicious, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting potentially malicious files, at least a portion of the method being performed by a computing device comprising at least one processor, the method comprising:
   detecting an attempt by the computing device to execute a file;
   prior to execution of the file:
      determining that a user interface of the computing device is presenting a filename of the file to a user;
      identifying a default number of characters per filename that the user interface displays when presenting filenames to the user; and
      determining that the filename of the file contains a false filename extension by identifying, within a middle section of the filename, a sequence of padding characters that:
         includes a period followed by at least a certain number of blank spaces; and
         obfuscates an actual filename extension of the file from view of the user by increasing the number of characters within the filename such that the number of characters exceeds the default number of characters displayed by the user interface;

determining, based at least in part on the middle section of the filename containing the false filename extension, that the file is potentially malicious; and in response to determining that the file is potentially malicious, preventing the computing device from executing the file.

2. The method of claim 1, wherein detecting the attempt by the computing device to execute the file comprises hooking a system call issued by an application launched from the file.

3. The method of claim 1, further comprising identifying the actual filename extension within an end section of the filename.

4. The method of claim 3, wherein:

the actual filename extension comprises an executable extension; and the false filename extension comprises a non-executable extension.

5. The method of claim 1, wherein identifying the sequence of padding characters within the middle section of the filename comprises comparing the filename to a malware signature that includes the sequence of padding characters.

6. The method of claim 1, wherein determining that the filename contains the false filename extension further comprises determining that the filename contains a period preceded by the certain number of blank spaces.

7. A system for detecting potentially malicious files, the system comprising:

a detection module, stored in memory, that detects an attempt by a computing device to execute a file;

a determination module, stored in memory, that, prior to execution of the file:

determines that a user interface of the computing device is presenting a filename of the file to a user;

identifies a default number of characters per filename that the user interface displays when presenting filenames to the user; and determines that the filename of the file contains a false filename extension by identifying, within a middle section of the filename, a sequence of padding characters that:

includes a period followed by at least a certain number of blank spaces; and obfuscates an actual filename extension of the file from view of the user by increasing the number of characters within the filename such that the number of characters exceeds the default number of characters displayed by the user interface; and determines, based at least in part on the middle section of the filename containing the false filename extension, that the file is potentially malicious;

a security module, stored in memory, that prevents the computing device from executing the file in response to the determination that the file is potentially malicious; and at least one physical processor configured to execute the detection module, the determination module, and the security module.

8. The system of claim 7, wherein the detection module hooks a system call issued by an application launched from the file.

9. The system of claim 7, wherein the determination module identifies the actual filename extension within an end section of the filename.

10. The system of claim 9, wherein:

the actual filename extension comprises an executable extension; and the false filename extension comprises a non-executable extension.

11. The system of claim 7, wherein the determination module compares the filename to a malware signature that identifies the sequence of padding characters.

12. The system of claim 7, wherein the determination module further determines that the filename contains a period preceded by the certain number of blank spaces.

13. A non-transitory computer-readable medium comprising one or more computer-executable instructions that, when executed by at least one processor of a computing device, cause the computing device to:

detect an attempt by the computing device to execute a file;

prior to execution of the file:

determine that a user interface of the computing device is presenting a filename of the file to a user;

identify a default number of characters per filename that the user interface displays when presenting filenames to the user; and determine that the filename of the file contains a false filename extension by identifying, within a middle section of the filename, a sequence of padding characters that:

includes a period followed by at least a certain number of blank spaces; and obfuscates an actual filename extension of the file from view of the user by increasing the number of characters within the filename such that the number of characters exceeds the default number of characters displayed by the user interface;

determine, based at least in part on the middle section of the filename containing the false filename extension, that the file is potentially malicious; and prevent the computing device from executing the file in response to determining that the file is potentially malicious.

14. The computer-readable medium of claim 13, wherein the one or more computer-executable instructions cause the computing device to hook a system call issued by an application launched from the file.

15. The computer-readable medium of claim 13, wherein the one or more computer-executable instructions cause the computing device to identify the actual filename extension within an end section of the filename.

16. The computer-readable medium of claim 15, wherein:

the actual filename extension comprises an executable extension; and the false filename extension comprises a non-executable extension.

* * * * *